United States Patent [19]
Ray et al.

[11] Patent Number: 5,321,751
[45] Date of Patent: Jun. 14, 1994

[54] METHOD AND APPARATUS FOR CREDIT CARD VERIFICATION

[75] Inventors: Lawrence A. Ray; Richard N. Ellson, both of Rochester, N.Y.

[73] Assignee: Eastman Kodak Company, Rochester, N.Y.

[21] Appl. No.: 19,538

[22] Filed: Feb. 18, 1993

[51] Int. Cl.⁵ .................................... H04K 1/00
[52] U.S. Cl. ......................... 380/23; 380/24; 380/25; 380/18
[58] Field of Search ................ 380/23, 24, 25, 18

[56] References Cited

U.S. PATENT DOCUMENTS

| | | | |
|---|---|---|---|
| 3,569,619 | 3/1971 | Simjian | 178/6.8 |
| 4,179,686 | 12/1979 | Bonicalzi et al. | 340/146.3 |
| 4,636,622 | 1/1987 | Clark | 235/380 |
| 4,811,408 | 3/1989 | Goldman | 382/2 |
| 4,821,118 | 4/1989 | Lafreniere | 358/108 |
| 4,879,747 | 11/1989 | Leighton et al. | 380/23 |
| 4,972,476 | 11/1990 | Nathans | 380/23 |
| 4,993,068 | 2/1991 | Piosenka et al. | 380/23 |
| 4,995,081 | 2/1991 | Leighton et al. | 380/23 |
| 5,027,401 | 6/1991 | Soltesz | 380/54 |
| 5,095,196 | 3/1992 | Miyata | 235/382 |

FOREIGN PATENT DOCUMENTS

| | | | |
|---|---|---|---|
| 0247788 | 12/1987 | European Pat. Off. | G06F 15/64 |
| 2592-197 | 12/1985 | France . | |
| 58-192190 | 11/1983 | Japan | G06K 19/00 |
| 3-185585 | 8/1991 | Japan | G06K 17/00 |
| WO87/03724 | 6/1987 | PCT Int'l Appl. | G07F 7/08 |
| 2173970 | 3/1986 | United Kingdom | H04N 1/41 |

*Primary Examiner*—David C. Cain
*Attorney, Agent, or Firm*—Thomas H. Close

[57] ABSTRACT

Techniques for multiple verification of credit cards incorporating digital image information and authorization data onto a credit card to assist in the card verification process. This technique requires the authorized card holder to have a picture identification accompany the application for the card. Picture information is converted to a digital image that is stored and used in one or a plurality of means for verifying that the presenter of the card, at the point of the transaction, is the authorized user. Such means include visual comparison of card presenter and extracted digital image information and verification that the data has not been altered. Encryption of the data, as it is read from the card, at the point of origin is used to formulate encoded authorization data that is then compared against like encoded authorized card holder data stored at a centrally located data base.

21 Claims, 3 Drawing Sheets

METHOD AND APPARATUS FOR CREDIT CARD VERIFICATION

TECHNICAL FIELD

The present invention relates to the field of credit cards and to the verification of the owner of the credit card. More particularly, the invention is directed to a method and associated apparatus for reading a credit card with a digital picture of the owner or authorized user and multiply validating the authenticity of the card.

BACKGROUND OF THE INVENTION

Visual verification of identity plays a role in many types of transactions and security procedures. For example, signatures, fingerprints or images of faces are compared in to establish identity. The creation of a fraudulent identities or the misrepresentation of identity results can allow individuals to commit fraud and breach security systems.

One system which relies on verification of identity for transactions is the credit and charge card system. These cards are an increasingly popular means for consumers and validation requestors to complete transactions. However, part of the cost incurred from this convenience is the burgeoning growth of card fraud. In 1991 the estimated cost to the financial industry for credit card fraud was $1.58 billion. The cost of this fraud is paid for by the banking/credit industry, but it is passed to the consumer in the form of higher card interest rates and fees and to the validation requestors in the form of additional transaction commission fees.

Methods used to combat this fraud have been the use of holographic images on cards, the need for validation requestors to obtain transaction approval, the encoding of cardholder information on magnetic strips on the back of the card, and signature verification. A well-known approach is to have image information available for visual verification that the card bearer is the authorized owner (see Luther G. Simjian, "Verification System using Coded Identifying and Storage Means," U.S. Pat. No. 3,569,619, issued Mar. 9, 1971) and is an important component in the present invention. A further refinement on this system is to scramble the image information (see Robert L. Nathans, "Counterfeit Proof ID Card having a Scrambled Facial Image," U.S. Pat. No. 4,972,476, issued May 11, 1989). Again, the descrambling and reconstruction of the facial image is validated at a single location. This could be defeated by a counterfeiter who has access to the scrambling algorithm. A similar notion is to have a decryption key carried along with the credit card, either by a PIN number or other device encoded on the magnetic stripe (see Frank T. Leighton and Silvio Micali, "Method and System for Personal Identification," U.S. Pat. No. 4,879,747, issued Mar. 21, 1988.) Recently the added feature of including a digitally printed likeness of the authorized cardholder has been introduced, known commercially as the Photocard, issued by Citibank. All of these methods have had some initial success, though each has been or will be eventually defeated by increasingly sophisticated counterfeiting. In the case of the photographic image on the card, the initial drop in fraud, in the New York test markets, has been as high as 67%. This reduction will likely diminish in time.

Other approaches have needed sophisticated equipment and/or the need for the cardholder to remember or have available special auxiliary information such as a personal identification number (PIN). As the typical consumer is estimated to carry between 8–10 credit cards, it is impractical for the consumer to remember and correctly match the PIN numbers with the proper credit card. This solution will meet with significant resistance from customers. The need for auxiliary equipment, such as scanners, video cameras, special gates and the like all will fail due to the added inconvenience to the consumer, in addition the sophisticated credit card criminal will not be deterred by such equipment.

The difficulty with most methods is that there is largely a single point of card validation. In the case of the Photocard, the image only resides with the card and is checked only by a clerk at the point-of-sale. Most clerks do not check these cards, and in some instances the card is never in the possession of the clerk. In order for a verification to be successful there has to be measures which occur both at the point of sale as well as through the denial of the transaction via a slight modification in the current card approval process.

SUMMARY OF INVENTION

The present invention is a means of embedding image information into the card and using that information to assist in the card approval process. There are several embodiments of this invention. All of the embodiments require that the holder of a card have a picture identification to accompany the application for the card. The picture identification is converted to a digital image, and the digital data is used in one or a plurality of means for the purposes of verifying that the presenter of the card at the point of the transaction is indeed the owner.

The digital image data and/or information extracted from that image data is encoded onto a medium like the magnetic stripe currently used by many cards or into an electronic storage system such as in "smart" cards. This information is used by the validation requestor at the point of sale to display a picture of the card presenter on a video monitor as a quick visual means for the validation requestor to check the validity of the account. In addition, as part of an electronic validation procedure, each validation requestor will have or be sent an identification code which determines an algorithm embedded in the card reader, which when applied to the image data encoded on the card returns a pre-approval code. The validation requestor identification code, the card account number, and the pre-approval code is sent to the card administration agency (CAA) and the same algorithm will be applied to the image information that is on file at the CAA. If the same result appears and the card account has adequate credit, then credit approval will be returned to the validation requestor. If the codes do not match, the card is assumed to be fraudulent and the request for credit is denied. Furthermore, if fraud is suspected by the validation requestor or the CAA, the image data encoded on the card can be captured and transmitted to the CAA and stored for future use in criminal proceedings.

In one preferred apparatus embodiment of the invention there is provided a credit card validation system comprising:

a credit card having digital data recorded thereon representing the image of at least one authorized user and authorizing data;

reader means for reading the digital data recorded on said credit card;

algorithm means for providing an encryption algorithm for encoding portions of the digital data;

a first processor means for encoding the digital data read from said credit card with the provided encryption algorithm;

means for displaying the digital image representing the authorized user;

a second processor means for receiving portions of the encoded digital data from said first processor; and a storage means having stored therein digital data corresponding to the authorizing data recorded on said credit card and encrypted with the provided encryption algorithm, said second processor means comparing the received portions of the encoded digital data from said first processor with the digital data from said storage means to provide a validation signal when a correspondence is detected.

A preferred method of the present invention is comprised of the steps of:

a) forming a digital image of an authorized credit card user on a credit card along with authorizing user data;

b) reading the digital data recorded on said credit card;

c) displaying the image represented by the digital image data;

d) visually determining if a match exists between the displayed image and the credit card user;

e) encoding portions of the digital data with an encryption algorithm if a match exists;

f) establishing a central data base for a multiplicity of card uses wherein encoded authorized user data is stored;

g) comparing the encoded portions of the digital data with encoded authorized user data to determine if a match exists; and h) sending a validation signal indicating the existence of a match.

From the foregoing it can be seen that a primary object of the present invention is the provision of a credit card that must be multiple validated.

Another object of the present invention is the provision of a credit card with a digital image that has been encoded with an encryption algorithm.

Yet another object of the present invention is the utilization of digital images on an image storage device such as the Kodak' Photo-CD system.

It is yet another object of the invention to provide a method for transmitting the digital image representing the users' image as stored on the card to a central processing point when a validation of the card indicates a problem.

Yet another object of the present invention to provide a verification image from the central processing point to the transaction site when the card is defective.

The above and other objects of the present invention will become more apparent when taken in conjunction with the following description and drawings, wherein like characters indicate like parts.

DETAILED DESCRIPTION OF THE INVENTION

Figure 1:
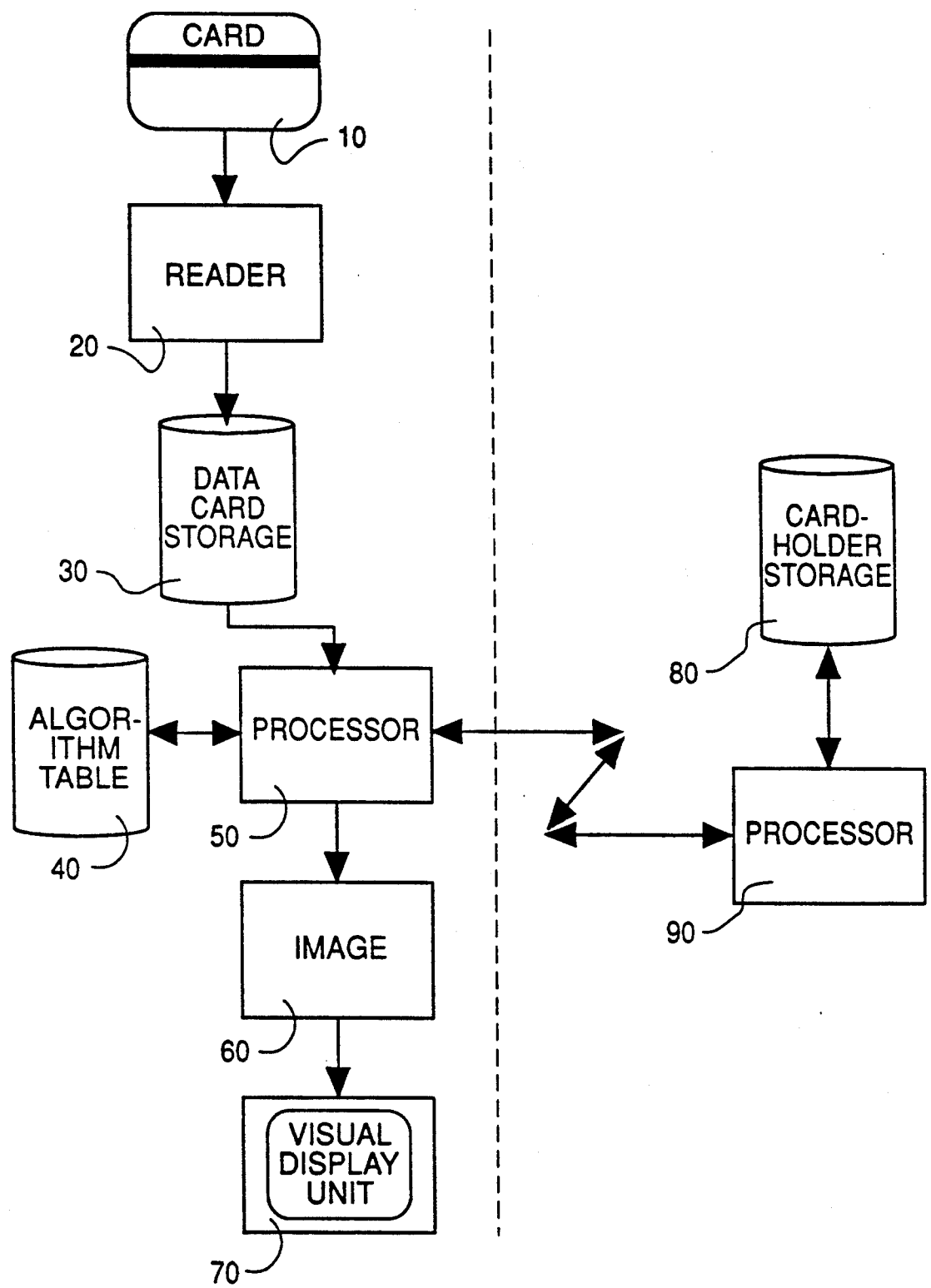
FIG. 1 is a block diagram illustrating the arrangement of the apparatus for performing the method of the present invention.

The present invention uses data taken from cardholders' photographs to be used in the validation procedure. A simple schematic of the apparatus used and the data-flow path is shown in FIG. 1. The information for the image data must come from the card applicant. Upon applying for a card the applicant must submit a photograph which contains the likeness of the applicant or some other unique information, such as a signature or fingerprint. This unique applicant information will be known hereinafter as a photograph. The photograph is digitally scanned and converted into a digital representation of the photograph. The digital information is compressed and may also be encrypted before being stored.

The location of data storage distinguishes different embodiments of the invention. In a first embodiment of the invention the image data is stored in readable digital form only on a card 10 itself. Thus, each card has image information unique to the cardholder.

Figure 2:
FIG. 2 is a sample facial image and an image that has undergone compression and decompression with a compression ratio that is adequate for storage on a credit card.
Figure 2:
Figure 3:
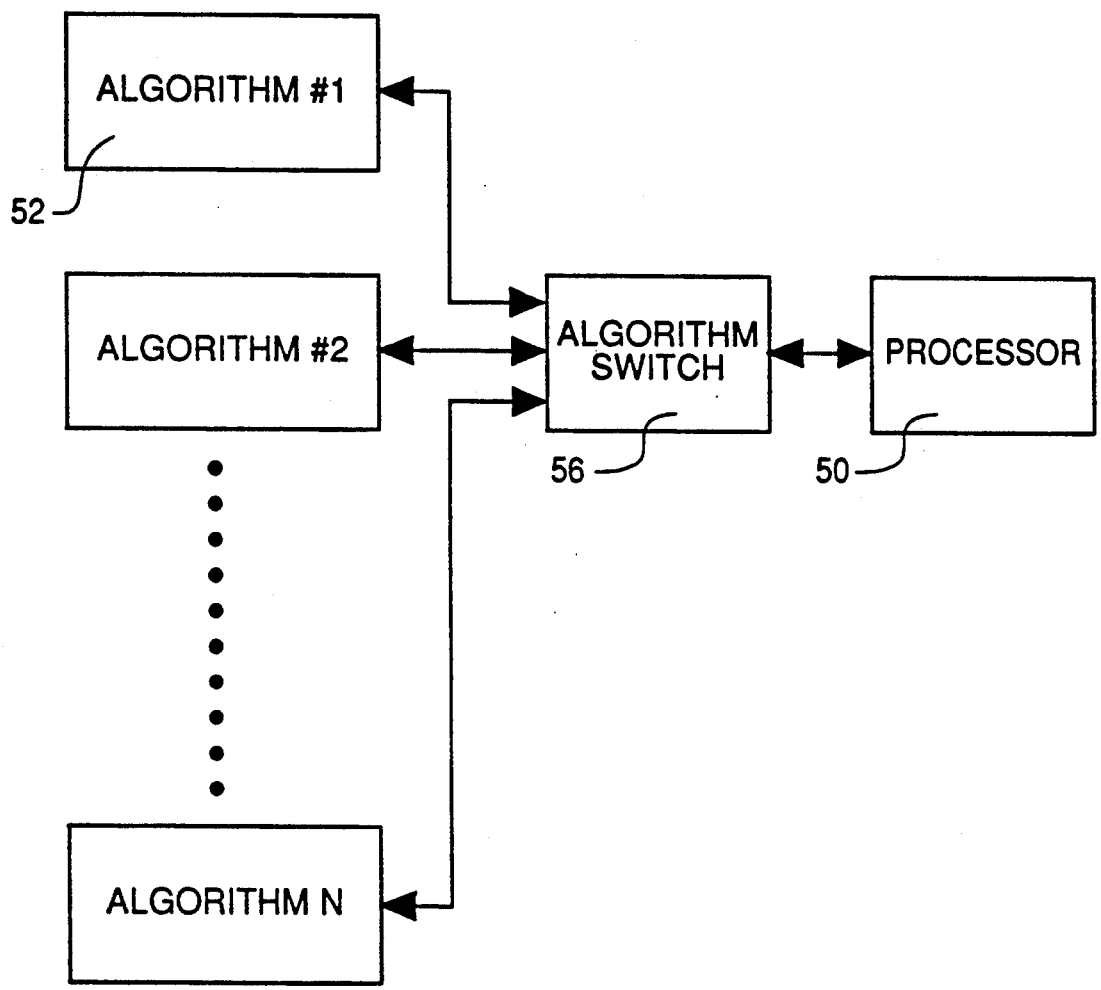
FIG. 3 is a block diagram illustrating a selection process for encryption algorithms.

At the point of sale the validation requestor will use a data reading device 20 to recover the encoded information from the card and reconstitute the photograph (image) 60. An 8 bit/pixel image with a resolution of 128×192 pixels can be compressed to less than 8000 bits and still retain sufficient image information to make an identification possible, (see FIG. 2). The 128×192 image corresponds to the thumbnail image that is used on Kodak's Photo-CD disk. This image is then displayed on a monitor 70 for the validation requestor to determine if the photograph is a reasonable likeness to the individual's appearance, signature and/or fingerprint. The image data is used as the input to a processor 50 which calculates the pre-approval code based upon an algorithm 52 (see FIG. 3) embedded in the algorithm table 40. A potential, but not limiting, example of an algorithm which is computationally efficient and based upon the data in the compressed image format is the extraction of a substring of bits from the image data and the application of a standard error correcting code such as Reed-Solomon to the substring to determine a string of parity bits. The algorithm can be selected by a switch 56 interposed between the algorithm table 40 and the processor 50 based on various means such as by default or a pseudo-random. choice from processor 50 or 90. Moreover, as part of the electronic validation procedure, the validation requestor accesses the credit data base 30 and transmits the validation requestor identification number, which determines which algorithm the magnetic reader 20 has embedded, the credit card number, and the result of the embedded algorithm to the CAA's processor 90. The CAA recovers the data assigned to the credit card number, and processes the image data with the algorithm assigned to the validation requestor code and compares the result with the pre-approval code. The processing at the CAA, optionally, can incorporate card-holder data previously stored in storage 80 which data may be pre-computed and stored as a look-up-table which accompanies the information concerning the account. This eliminates the need to recover the digital image information for each transaction being processed, as well as speeding up the approval process. If a match is made and credit is available then an approval code is sent to the validation requestor which permits the transaction to be completed.

If the pre-approval code and the code computed at the CAA do not agree, then an image of the fraudulent card holder is already available, as the validation requestor has confirmed that the card bearer has a strong likeness to the reconstituted image. The CAA can then automatically request that the image information be transmitted to them. The reconstituted image may then be forwarded to law enforcement agencies. With a compression scheme of approximately 25:1, the resulting data required is approximately 8000 bits, which requires approximately 3 seconds to transmit with a standard 2400 baud modem.

A variation of this process is for the digital image data to reside solely with the CAA and once the validation requestor electronically requests credit approval encoded image data is transmitted to the validation requestor which can be displayed on a small monitor. The validation requestor then visually determines if the person presenting the credit card matches the image displayed on the monitor. This would reduce the information storage requirements on the magnetic stripe, but would increase the volume of data exchange. Again, the data transmission needed would take approximately 3 seconds using a standard 2400 baud modem. This approach is also useful in the situation where the image information has been corrupted due to such factors as the magnetic stripe coming in close contact to a magnetic source. However, in this case an alternative data compression method is preferred in order to prevent coded data from being improperly intercepted and used for fraudulent purposes.

ADVANTAGES

The advantage of this approach is that information concerning the validity of a credit card is multiply validated, at the point of sale and at a remote and trusted site. Moreover, for the credit to be approved, the same image information would have to be held by both the CAA and the credit card holder. The algorithm to validate the card would be only held by the validation requestor and the CAA. Also, a facsimile of the credit card holder appearing for the validation requestor to corroborate the validation by the CAA would also present another deterrent to the fraudulent use of credit cards. If the image data is modified by a credit card fraud, then the information used by the pre-approval algorithm would be different than the data available to the CAA and the pre-approval algorithm would produce a different result, invalidating the card. Moreover, since the algorithm code is used randomly among validation requestors, attempting to circumvent the algorithm by a clever re-encoding would also be thwarted, making fraudulent charges much more difficult. Also, knowledge that bearers of fraudulent cards would have their images captured will also be a deterrent, much like video cameras in banks.

The cost of this method is recovered by the reduction of fraudulent charges being made upon credit cards. Since this cost is borne by the CAA, the savings that result, immediately become assets of the CAA.

The cost of producing the card in order to have the visual validation is approximately half of the cost to manufacture the Photocard.

Another advantage is that the cardholder will not be required to carry any additional information, such as a PIN number to corroborate the validity of the card. This will make acceptance of the card easier, as the validation comes with no significant inconvenience to the consumer.

The equipment necessary to perform this check will not be significantly different than that currently in place.

While there has been shown what are considered to be the preferred embodiments of the invention, it will be manifest that many changes and modifications may be made therein without departing from the essential spirit of the invention. It is intended, in the annexed claims, to cover all such changes and modifications as may fall within the true scope of the invention.

We claim:

1. A credit card validation system comprising:
   a credit card having digital data recorded thereon representing the image of at least one authorized user and authorizing data;
   reader means for reading the digital data recorded on said credit card;
   algorithm means for providing an encryption algorithm for encoding portions of the digital data;
   a first processor means for encoding the digital data read from said credit card with the provided encryption algorithm;
   means for displaying the digital image representing the authorized user;
   a second processor means for receiving portions of the encoded digital data from said first processor; and
   a storage means having stored therein digital data corresponding to the authorizing data recorded on said credit card and encrypted with the provided encryption algorithm, said second processor means comparing the received portions of the encoded digital data from said first processor with the digital data from said storage means to provide a validation signal when a correspondence is detected.

2. A credit card validation system comprising:
   a credit card having digital data recorded thereon representing the image of at least one authorized user and authorizing data;
   reader means for reading the digital data recorded on said credit card;
   first algorithm means for providing an encryption algorithm for encoding portions of the digital data;
   a first processor means for encoding the digital data read from said credit card with the provided encryption algorithm;
   means for displaying the digital image representing the authorized user;
   a second processor means for receiving portions of the encoded digital data from said first processor;
   a storage means having stored therein digital data corresponding to the authorizing data recorded on said credit card; and
   second algorithm means for providing an encryption algorithm for encoding portions of the digital data accessed from said storage means and for providing said encoded portions to said second processor means for comparison with the received portions of the encoded digital data from said first processor, said second processor providing a validation signal when a correspondence is detected.

3. The credit card validation system according to claim 1 or 2 wherein said algorithm means provides a plurality of encryption algorithms for selective encoding portions of the digital data.

4. The credit card validation system according to claim 1 or 2 wherein the selection of an encryption algorithm is pseudo random.

5. The credit card validation system according to claim 1 or 2 wherein said algorithm means provides a plurality of encryption algorithms for selective encoding of portions of the digital data.

6. The credit card validation system according to claim 1 or 2 and further comprising:
   means for accessing said second processor when an operator determines that a match exists between the displayed image and the person offering the card for validation.

7. The credit card verification system according to claims 1 or 2 wherein said second processor selects the encryption algorithm for said first processor means.

8. The credit card verification system according to claims 1 or 2 wherein digital image data recorded on said credit card is in compressed from.

9. The credit card verification system according to claim 1 or 2 wherein said first and said second algorithm means is comprised of a plurality of selectable encryption algorithms.

10. The credit card verification system according to claims 1 or 2 wherein said storage means is a photographic compact disk system.

11. The credit card verification system according to claim 1 or 2 wherein said second processor means requests the image data stored on said credit card for the case where a correspondence is not detected.

12. The credit card verification system according to claims 1 or 2 wherein said second processor selects the encryption algorithm for said first processor means.

13. A method for validating a credit card comprising the steps of:
   a) forming a digital image of an authorized credit card user on a credit card along with authorizing user data;
   b) reading the digital data recorded on said credit card;
   c) displaying the image represented by the digital image data;
   d) visually determining if a match exists between the displayed image and the credit card user;
   e) encoding portions of the digital data with an encryption algorithm if a match exists;
   f) establishing a central data base for a multiplicity of card uses wherein encoded authorized user data is stored;
   g) comparing the encoded portions of the digital data with encoded authorized user data to determine if a match exists; and
   h) sending a validation signal indicating the existence of a match.

14. A credit card validation system, comprising:
   a. a credit card having digital data recorded thereon representing a photograph of an authorized user;
   b. first validation means for validating the authenticity of a user including means response to said digital data for displaying the photograph representing the authorized user to a validation requestor at a point-of-sale; and
   c. second validation means for validating the authenticity of the credit card, including means for matching a pre-approval code generated at the point of sale by encrypting a portion of the digital data, with a pre-approval code produced at a remote card administrative agency.

15. The credit card validation system claimed in claim 14, wherein said means for matching includes:
   a. first processor means located at the point of sale for applying an encryption algorithm to a portion of said digital data to produce a pre-approval code; and
   b. second processor means located at said card administration agency for producing a pre-approval code generated from applying said encryption algorithm to digital data stored at said card administration agency.

16. The credit card validation system claimed in claim 15, wherein said encryption algorithm is selected from a plurality of encryption algorithms and further comprising means for transmitting a validation requestor identification code identifying a selected encryption algorithm from said point-of-sale to said card administration agency.

17. The credit card validation system claimed in claim 15, further comprising means for transmitting said pre-approval code, said validation requestor identification code and a user credit card number from said point-of-sale to said card administration agency.

18. The credit card validation system claimed in claim 17, wherein said second processor means includes:
   a. a memory containing a table of pre-generated pre-approval codes associated with particular user credit card numbers and validation requestor identification codes;
   b. means for retrieving a particular pre-approval code from said table; and
   c. means for comparing said retrieved pre-approval code with said transmitted pre-approval code.

19. The credit card validation system claimed in claim 17, wherein said second processor means includes:
   a. a memory containing digital data representing a photograph of an authorized user, associated with a user credit card number, and a plurality of encryption algorithms associated with validation requestor identification codes;
   b. means for retrieving digital data and an encryption algorithm from said memory, and applying said retrieved encryption algorithm to said retrieved digital data to produce a retrieved pre-approval code; and
   c. means for comparing said transmitted pre-approval code with said retrieved pre-approval code.

20. The credit card validation system claimed in claim 14, further comprising means for capturing and storing said digital data from said card if said second validation means fails to match said pre-approval codes.

21. A credit card validation system, comprising:
   a. a credit card having digital data recorded thereon representing the image of at least one authorized user and a credit card number;
   b. reader means for reading the digital data recorded on said credit card;
   c. means for applying an encryption algorithm to the digital data to produce a pre-approval code;
   d. means for transmitting said pre-approval code, said credit card number, and a validation requestor identification number to a remote card administration agency (CAA)

e. means for displaying the digital image representing the authorized user to a validation requestor at a point-of-sale;
f. storage means located at said CAA having stored therein credit card numbers and data sufficient for producing retrieved pre-approval codes;
g. means located at said CAA for receiving said transmitted pre-approval code, said credit card number, and said validation requestor identification number and retrieving a pre-approval code from said storage means; comparing said retrieved pre-approval code with said transmitted pre-approval code, and producing an approval code when said retrieved pre-approval code matches said transmitted pre-approved code; and
h. means for transmitting said approval code to the validation requestor at the point-of-sale.

* * * * *